(12) United States Patent
Kim et al.

(10) Patent No.: US 12,685,963 B2
(45) Date of Patent: Jul. 21, 2026

(54) COMPOSITE SEPARATOR FOR GAS SEPARATION

(71) Applicants: SK INNOVATION CO., LTD., Seoul (KR); SK IE TECHNOLOGY CO., LTD, Seoul (KR)

(72) Inventors: Dong Jae Kim, Daejeon (KR); Hye Jin Kim, Daejeon (KR); Min Sang Park, Daejeon (KR); Sin Woo Kim, Daejeon (KR); Yu Mi Choi, Daejeon (KR)

(73) Assignees: SK INNOVATION CO., LTD., Seoul (KR); SK IE TECHNOLOGY CO., LTD, Seoul (KR)

( * ) Notice: Subject to any disclaimer, the term of this patent is extended or adjusted under 35 U.S.C. 154(b) by 305 days.

(21) Appl. No.: 18/511,239

(22) Filed: Nov. 16, 2023

(65) Prior Publication Data

US 2024/0173666 A1 May 30, 2024

(30) Foreign Application Priority Data

Nov. 30, 2022 (KR) ........................ 10-2022-0164858

(51) Int. Cl.
| | |
|---|---|
| *B01D 53/02* | (2006.01) |
| *B01D 53/22* | (2006.01) |
| *B01D 69/02* | (2006.01) |
| *B01D 69/10* | (2006.01) |
| *B01D 69/12* | (2006.01) |

(52) U.S. Cl.
CPC ........... *B01D 53/228* (2013.01); *B01D 69/02* (2013.01); *B01D 69/107* (2022.08); *B01D 69/1216* (2022.08); *B01D 2257/504* (2013.01); *B01D 2325/02834* (2022.08);
(Continued)

(58) Field of Classification Search
CPC .... B01D 2257/504; B01D 2325/02834; B01D 2325/04; B01D 2325/06; B01D 2325/20; B01D 2325/24; B01D 53/228; B01D 69/02; B01D 69/10; B01D 69/107; B01D 69/1216; B01D 71/26
See application file for complete search history.

(56) References Cited

U.S. PATENT DOCUMENTS

| | | | | |
|---|---|---|---|---|
| 10,033,070 | B2 * | 7/2018 | Busch ................. | H01M 50/446 |
| 2015/0093627 | A1 * | 4/2015 | Busch ................. | H01M 50/403 |
| | | | | 264/129 |

(Continued)

FOREIGN PATENT DOCUMENTS

| | | |
|---|---|---|
| WO | 2016203215 A1 | 12/2016 |
| WO | 2020028079 A1 | 2/2020 |

OTHER PUBLICATIONS

Bilchak et al., Polymer-Grafted Nanoparticle Membranes with Controllable Free Volume, Macromolecules, Sep. 15, 2017, 7111-7120, vol. 50, ACS Publications.

*Primary Examiner* — Christopher P Jones
(74) *Attorney, Agent, or Firm* — IP & T GROUP LLP

(57) ABSTRACT

Provided is a composite separator for gas separation. According to an aspect of the present disclosure, a composite separator for gas separation includes a support and a selective layer disposed on one surface of the support, wherein the support includes a porous polyethylene film, and has a surface roughness of 100 nm or less, a surface median pore diameter of 300 nm or less, and a tensile strength in a machine direction (MD) and a transverse direction (TD) of 10 MPa or more.

13 Claims, 4 Drawing Sheets

(52) U.S. Cl.
CPC ...... *B01D 2325/04* (2013.01); *B01D 2325/06* (2013.01); *B01D 2325/20* (2013.01); *B01D 2325/24* (2013.01)

(56)                    References Cited

U.S. PATENT DOCUMENTS

| 2015/0157980 | A1* | 6/2015 | Mochizuki | B01D 53/62 |
|---|---|---|---|---|
| | | | | 422/177 |
| 2017/0203559 | A1* | 7/2017 | Noguchi | B01D 69/02 |
| 2022/0032241 | A1* | 2/2022 | Yu | B01D 69/08 |

* cited by examiner

SKI-AL-LAB 5.0kV 10.7mm x10.0k 9/27/2022          5.00um

COMPOSITE SEPARATOR FOR GAS SEPARATION

CROSS-REFERENCE TO RELATED APPLICATION

This application claims priority under 35 U.S.C. § 119 to Korean Patent Application No. 10-2022-0164858, filed on Nov. 30, 2022, in the Korean Intellectual Property Office, the disclosure of which is incorporated herein by reference in its entirety.

TECHNICAL FIELD

The present disclosure relates to a composite separator for gas separation having significantly improved gas separation ability.

BACKGROUND

A gas separation technology refers to a technology of separating only a certain gas component of a gas mixture, and since the technology is used throughout the industry ranging from an industrial field to medical, biochemical, and environmental fields, it is very important. As an example, it may be used in a carbon dioxide capture & storage (CCS) technology, which is a technology of separating carbon dioxide discharged from mass emission sources such as power plants, steel, and cement plants due to the use of fossil fuels from the air. Besides, the gas separation technology is being used in a petrochemical process and separation and recovery of hydrogen from syngas, and is being applied to enhanced oil recovery (EOR), natural gas refinement, landfill gas recovery, air separation (oxygen enrichment or nitrogen manufacturing), dehydration, degassing, helium recovery, and the like as other application fields.

Currently, a gas separation process is usually performed by a distillation method, an extraction method, an evaporation method, an adsorption method, and the like, but the method consumes too much energy so that the energy consumption accounts for about 40% of total energy consumption in the industry. Thus, a gas separation technology using a separator, which consumes less energy and is an environmentally friendly method, is being actively studied. The technology using a separator also has merits such as a low ratio of volume to area and easy scale-up as well as high energy efficiency.

A separator used in gas separation generally has a structure including a selective layer for separating a specific gas and a support for supporting the selective layer. Since it is known that the selective separation ability and the permeability of selectively separated certain gas of the separator are greatly influenced by the selective layer material, the selective layer material such as a graphene oxide and a metal organic framework (MOF) is being actively studied.

A currently developed support includes a support having pores formed using phase inversion after coating a nonwoven fabric with a material such as polyether sulfone, polysulfone, and polyacrylonitrile.

SUMMARY

An embodiment of the present disclosure provides a composite separator for gas separation having a uniformly formed selective layer of a thin film to have significantly improved selectivity and permeability without occurrence of defects, by including a support of a thin film having both excellent mechanical strength and specific surface properties.

Another embodiment of the present disclosure provides a gas separation method which may separate specific gas with significantly improved selectivity and permeability using the composite separator for gas separation described above.

According to an embodiment of the present disclosure, a composite separator for gas separation includes: a support and a selective layer disposed on one surface of the support, wherein the support includes a porous polyethylene film, and has a surface roughness of 100 nm or less, a surface median pore diameter of 300 nm or less, and a tensile strength in a machine direction (MD) and a transverse direction (TD) of 10 MPa or more.

In an embodiment, the porous polyethylene film may have a gas permeability of 850 sec/100 cc or less.

In an embodiment, the support may have a surface roughness of 50 nm or less.

In an embodiment, the support may have a thickness ranging from 5 μm to 100 μm.

In an embodiment, the selective layer may have a thickness ranging from 10 nm to 500 nm.

In an embodiment, the composite separator for gas separation may further include a middle layer disposed between the selective layer and the support.

In an embodiment, the composite separator for gas separation may further include a protective layer disposed on the selective layer.

In an embodiment, the composite separator may have a thickness of 150 μm or less.

In an embodiment, the composite separator may have a specific surface area of the selective layer according to the following Equation 1 of 10,000 $m^2/m^3$ or more:

$$\text{Specific surface area of selective layer} = \text{surface area of selective layer } (m^2)/\text{volume of composite separator } (m^3). \qquad \text{[Equation 1]}$$

In another general aspect, a gas separation method includes separating a specific gas from a gas mixture using the composite separator for gas separation.

In an embodiment, the specific gas may be selected from the group consisting of carbon dioxide, hydrogen, helium, oxygen, hydrocarbon, and olefin.

Other features and aspects will be apparent from the following detailed description, the drawings, and the claims.

DETAILED DESCRIPTION OF EMBODIMENTS

Figure 1:
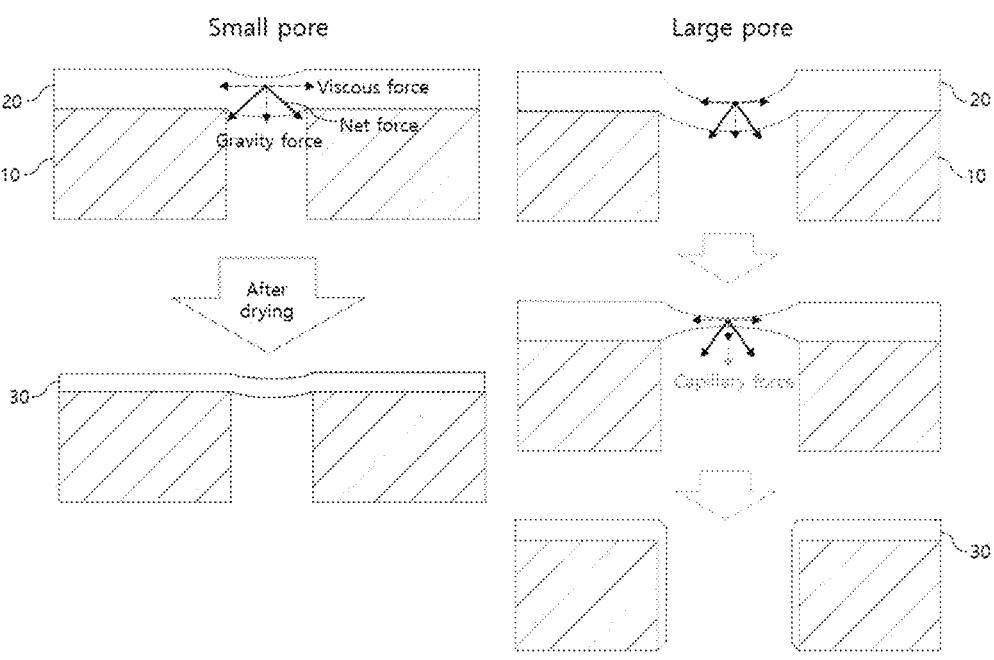
FIG. 1 is a schematic diagram describing an effect of a surface pore diameter on formation of a selective layer.

Hereinafter, a composite separator for gas separation of the present disclosure and a gas separation method using the same will be described in detail.

The embodiments described in the present specification may be modified in many different forms, and the present invention is not limited to the embodiments set forth herein. In addition, the embodiments of the present invention are provided so that the present disclosure will be described in more detail to a person with ordinary skill in the art.

In addition, the singular form used in the specification and claims appended thereto may be intended to include a plural form also, unless otherwise indicated in the context.

In addition, the numerical range used in the present specification includes all values within the range including the lower limit and the upper limit, increments logically derived in a form and span of a defined range, all double limited values, and all possible combinations of the upper limit and the lower limit in the numerical range defined in different forms. Unless otherwise defined in the present specification, values which may be outside a numerical range due to experimental error or rounding off of a value are also included in the defined numerical range.

Furthermore, throughout the specification, unless explicitly described to the contrary, "comprising" any constituent elements will be understood to imply further inclusion of other constituent elements.

The composite separator for gas separation according to an embodiment includes: a support and a selective layer disposed on one surface of the support, wherein the support may include a porous polyethylene film, and have a surface roughness of 100 nm or less, a surface median pore diameter of 300 nm or less, and a tensile strength in a machine direction (MD) and a transverse direction (TD) of 10 MPa or more.

Since a conventional separator including a support (support layer) and a selective layer has a thick support to cause a decrease in permeability of an overall separator and tends to have lower mechanical strength when the thickness is small, it has a limitation of not implementing physical properties of excellent gas permeability and excellent mechanical strength. Furthermore, the support has a tensile strength of only less than 10 MPa even at a thickness of 150 un and is difficult to withstand high tension in an application process and a module manufacturing process using the support, and thus, a problem of process stability deterioration may arise.

As a method for improving strength of the conventional support, a non-woven fabric is manufactured using composite fibers having different melting points and then calendered or different kinds of non-woven fabrics are combined. However, the composite material still does not have sufficient tensile strength. Furthermore, when a selective layer is formed using the material as a support, the thickness of the selective layer is non-uniformly formed or a surface damage problem such as pin holes arises, resulting in a decrease in selectivity of a separator. When the selective layer is coated thickly for improving selectivity, permeability is lowered.

Specifically, performance of the separator may be deteriorated even with occurrence of 0.0001% (100 ppm) of pin holes based on the surface area on the surface of the selective layer, and when there are 0.01% or 0.2% of defects, selection/separation function is almost lost.

Thus, the inventors of the present disclosure repeatedly studied a gas separator material in which the selective layer is formed at a uniform thickness without occurrence of defects so that selectivity and permeability are significantly improved, and as a result, found that the surface properties of the support affect formation of the selective layer. Specifically, the inventors found that when the selective layer is formed on a support which satisfies a surface smoothness and a surface pore size, the selective layer of a thin film may be formed at a uniform thickness without occurrence of defects, and completed the present disclosure. In addition, since the composite separator according to an embodiment includes a support having excellent mechanical strength, it may have significantly improved process stability. In addition, since the composite separator includes the support described above, a selective layer having a large area per equal volume may be filled, and thus, a separation permeation amount may be significantly improved in a module state.

In an embodiment, the support may have a surface roughness of 100 nm or less, 80 nm or less, and 50 nm or less, or 30 nm or less. The lower limit of the surface roughness is not particularly limited, but may be 0.1 nm or more or 1 nm or more. For example, the support may have a surface roughness of 0.1 to 100 nm, 1 to 80 nm, 1 to 50 nm, or 1 to 30 nm. Herein, the surface roughness is an arithmetic mean surface roughness (Ra) and may be measured using atomic force microscopy (AFM).

Since the support has the surface roughness in the range described above to satisfy excellent surface smoothness, the selective layer of a thin film may be formed at a uniform thickness on the support, and defects such as a pin hole which is one of the causes of lowered selectivity may not occur on the surface of the selective layer. However, in the case in which the support is out of the range described above, defects occur when a thin selective layer is applied, and in the case in which a thick selective layer is coated in order to prevent this, permeability is lowered.

In an embodiment, the support may be a porous support, and specifically, a median pore size on the surface may be 300 nm or less, 275 nm or less, or 250 nm or less, and the lower limit is not limited, but, as an example, may be 10 nm or more or 50 nm or more. For example, the support may have a median pore size of 10 to 300 nm, 10 to 275 nm, or 50 to 250 nm. Herein, the surface median pore diameter may refer to D50 measured from a scanning electron microscopic (SEM) image of the surface of the support. D50 specifically refers to a particle size (D50) corresponding to the cumulative frequency of 50%. FIG. 1 is a schematic diagram describing an effect of a surface pore diameter on formation of the selective layer. Referring to FIG. 1, when the pore diameter of the support 10 is out of the range described above, the selective layer before drying 20 cannot withstand the force applied thereto, and the selective layer 30 with an uneven thickness may be formed. However, since the support 10 has the surface median pore diameter in the range described above, the selective layer before drying 20 can withstand the force applied thereto and the selective layer 30 of uniform thickness may be formed on the support.

In an embodiment, the support may have a tensile strength in a machine direction (MD) and a transverse direction (TD) of 10 MPa or more, specifically 20 MPa or more, and more specifically 30 MPa or more. Although the upper limit is not particularly limited, it may be 500 MPa or less or 300 MPa or less, as an example. Specifically, the support may have a tensile strength in a machine direction (MD) and a transverse direction (TD) ranging from 10 to 500 MPa, from 20 to 300 MPa, or from 30 to 300 MPa. Herein, the tensile strength may be measured, for example, in accordance with ASTM-D-882-61T.

Since the composite separator for gas separation according to an embodiment includes the support satisfying the tensile strength in the range described above, it may have mechanical strength appropriate for a selective layer application process and a module assembly process. Most of all, the support may have the tensile strength in the range described above even when a thickness of a selective layer is 100 μm or less, 50 μm or less, or 25 μm or less. Accordingly, a larger area of the selective layer per the separator having the same volume may be filled, and a separation permeation amount may be significantly increased in the same volume module.

In an embodiment, the porous polyethylene film may be manufactured by dissolving a pore forming agent in a polyethylene-based resin and then performing extraction. That is, the porous polyethylene film may be manufactured by a wet method, and thus, may have the surface roughness, the surface median pore size, and the tensile strength in the range described above. Therefore, a composite separator may have significantly improved process stability, selectivity, and permeability.

Specifically, the porous polyethylene film may be manufactured to have a sheet form by extruding and stretching a mixture in which a pore forming agent is dissolved in a polyethylene-based resin and extracting the pore forming agent from the sheet. A common wet method known to a person skilled in the art may be used. However, the manufacturing process of the porous polyethylene film is not particularly limited as long as a film having the physical properties described above is manufactured.

In an embodiment, a weight ratio between the polyethylene-based resin and the pore forming agent may be 1:1 to 1:10. When the weight ratio in the range described above is satisfied, since the dissolution, extrusion, stretching, and extrusion processes described above are effectively performed, the porous polyethylene film according to an embodiment may be manufactured into a uniform film, and thus, the surface roughness, the surface median pore diameter, and the mechanical strength described above may be implemented.

In an embodiment, the polyethylene-based resin may be one or a combination of two or more selected from high-density polyethylene, medium-density polyethylene, low-density polyethylene, linear low-density polyethylene, and ultrahigh molecular weight polyethylene.

In an embodiment, the polyethylene-based resin may have a weight average molecular weight of 50,000 g/mol to 2,000,000 g/mol. In an embodiment, for example, the polyethylene-based resin may have a weight average molecular weight of 100,000 g/mol to 1,000,000 g/mol, but is not limited thereto.

In an embodiment, any pore forming agent may be used without limitation as long as it forms a single phase with the polyethylene-based resin, and for example, may be one or a combination of two or more selected from the group consisting of aliphatic or cyclic hydrocarbons such as nonane, decane, decalin, paraffin oil, and paraffin wax, phthalic acid esters such as dibutyl phthalate and dioctyl phthalate, C10-C20 fatty acids such as palmitic acid, stearic acid, oleic acid, linoleic acid, and linolenic acid, and C10-C20 fatty acid alcohols such as alcohol palmitate, alcohol stearate, and alcohol oleate.

In an embodiment, the pore forming agent may be extracted from a mixture or sheet including the polyethylene-based resin and the pore forming agent using an organic solvent, in which any organic solvent may be used without particular limitation as long as the pore forming agent may be extracted. For example, as the organic solvent, methyl ethyl ketone, methylene chloride, hexane, and the like which have high extraction efficiency and are dried fast may be used.

In an embodiment, a gas permeability of the support refers to a Gurley permeability, and may be 850 sec/100 cc or less, 500 sec/100 cc or less, 400 sec/100 cc or less, 300 sec/100 cc or less, 200 sec/100 cc or less, or 150 sec/100 cc or less. Although the lower limit is not particularly limited, it may be 10 sec/100 cc or more or 50 sec/100 cc or more, as an example. For example, the support may have the gas permeability of 10 to 850 sec/100 cc, 10 to 500 sec/100 cc, 50 to 400 sec/100 cc, 50 to 300 sec/100 cc, 50 to 200 sec/100 cc, or 50 to 150 sec/100 cc. Herein, the gas permeability may be measured in accordance with the standard of ASTM D726.

Since the support satisfies the gas permeability in the range described above, improvement of process stability, selectivity, and permeability intended in the present disclosure may be more effectively achieved.

In an embodiment, the support may include one or more layers, and each layer may include the porous polyethylene film described above.

In an embodiment, the support may have a thickness of 5 μm to 100 μm, 5 μm to 50 μm, or 5 μm to 25 μm. Although the support may have a significantly small thickness (i.e., 5 μm) as described above, the composite separator according to an embodiment may have a tensile strength of 10 MPa or more, 20 MPa or more, or 30 MPa or more. Accordingly, stability in the selective layer application process and the module assembly process may be increased, and also the selective layer may have a large area per separator volume, and thus, separation permeation amount may be significantly increased even in a module having the same volume.

In an embodiment, the selective layer may have a thickness of 10 nm to 500 nm, 10 nm to 300 nm, or 50 nm to 200 nm, but is not particularly limited thereto.

The selective layer may be used without limitation as long as it has selective separation ability for gas separation. As the selective layer which separates specific gas from a gas mixture, polymer-based materials such as polyimide, cellulose acetate, polyethylene oxide, polyamide, polydimethylsiloxane, carbon-based materials such as graphene oxide, graphene, and carbon nanotube, inorganic materials such as zeolite, aluminosilicate mineral, and metal organic framework, or combinations thereof may be used, but the present disclosure is not particularly limited thereto.

In an embodiment, the composite separator for gas separation may further include a middle layer (gutter layer), a protective layer, and the like, and may achieve the object of the present disclosure more effectively.

In an embodiment, the composite separator for gas separation may further include a middle layer disposed between the selective layer and the support.

In an embodiment, the middle layer may have a thickness of 10 nm to 1000 nm, 50 nm to 500 nm, or 100 nm to 500 nm, but is not particularly limited thereto.

In an embodiment, the middle layer is not particularly limited as long as it is a material which may easily join two layers of the support and the selective layer, and may include a siloxane-based polymer or a polyacetylene-based polymer. An example of the siloxane-based polymer may include polydimethylsiloxane (PDMS) and the like, and an example of the polyacetylene-based polymer may be any one or more selected from poly(1-trimethylsilyl-1-propyne) (PTMSP), poly(4-methyl-1-pentene) (PMP), poly(tert-butylacetylene) (PTBA), and the like, but they are not limited thereto.

In an embodiment, the composite separator for gas separation may further include a protective layer disposed on the selective layer. That is, the composite separator further including a protective layer according to an embodiment may have a structure in which the support, the selective layer, and the protective layer are stacked sequentially or a structure in which the support, the middle layer, the selective layer, and the protective layer are stacked sequentially.

In an embodiment, the protective layer may have a thickness of 10 nm to 3000 nm, 50 nm to 2000 nm, or 100 nm to 2000 nm, but is not particularly limited thereto.

The protective layer may be used without limitation as long as it does not lower the gas permeability, and for example, may be a siloxane-based polymer such as polydimethylsiloxane (PDMS), a fluorine-based polymer, a polyolefin-based polymer, and the like.

The protective layer may include a porous polyethylene film which is used in the support according to an embodiment in terms of excellent gas permeability and mechanical strength, but is not limited thereto.

In an embodiment, the composite separator may have a thickness of 150 μm or less, 100 μm or less, 70 μm or less, or 50 μm or less. Although the lower limit may not be particularly limited, as an example, the thickness may be 5 μm or more or 20 μm or more. The composite separator may have physical properties of significantly excellent process stability, selectivity, and permeability, while having a significantly small thickness in the range described above.

In an embodiment, the composite separator may have a specific surface area of the selective layer according to the following Equation 1 of 6,000 m²/m³ or more, 10,000 m²/m³ or more, or 20,000 m²/m³ or more Although the upper limit is not particularly limited, the specific surface area may be, as an example, 25,000 m²/m³ or less or 35,000 m²/m³ or less.

Specific surface area of selective layer=surface area of selective layer (m²)/volume of composite separator (m³) [Equation 1]

Since the composite separator has the specific surface area of the selective layer in the range described above, the composite separator may have a merit of filling a selective layer having a large area per composite separator volume during module assembly. That is, the composite separator has a merit of having an effect of a significantly increased separation permeation amount in a module having the same volume. The merit is shown since the support having the physical properties described above may achieve high mechanical strength even at a small thickness.

A gas separation method according to an embodiment may be separating specific gas from a gas mixture using the composite separator for gas separation according to an embodiment described above.

When the composite separator in which the selective layer of a thin film is uniformly formed without occurrence of defects is used to separate a specific target gas, the specific gas may be separated with a significantly high gas permeability and selectivity.

In an embodiment, the specific gas may be any one selected from the group consisting of carbon dioxide, hydrogen, helium, nitrogen, oxygen, and olefin, but is not particularly limited thereto.

The gas mixture may include the specific gas and one or more gases other than that. The gas mixture may be selected from the group consisting of carbon dioxide/nitrogen, carbon dioxide/methane, carbon dioxide/carbon monoxide, hydrogen/methane, hydrogen/propane, hydrogen/nitrogen, helium/carbon dioxide, nitrogen/methane, oxygen/nitrogen, and olefin/paraffin.

Specifically, the gas separation method may include a first step of passing a specific gas-containing gas mixture across a composite separator having a supply side and a permeation side; and a second step of recovering a gas in the permeation side; wherein the matters for the composite separator described above may be applied to the composite separator.

Hereinafter, the examples of the present disclosure will be further described with reference to the specific experimental examples. It will be apparent to those skilled in the art that the examples and the comparative examples included in the experimental examples are provided only for the purpose of illustrating the present disclosure. However, the scope of the present disclosure is not limited to the experimental examples, and various modifications and alterations of the examples may be made within the scope of the present disclosure.

[Method of Evaluating Physical Properties]

1. Thickness of Each Layer and Median Pore Diameter (D50) of Support Surface

Thicknesses of a support, a middle layer, and a selective layer were measured from a cross-sectional image observed with a scanning electron microscope (SEM).

A median pore diameter of a support surface was measured from a surface image observed with a field emission scanning electron microscope (FE-SEM, S-4800 available from Hitachi), and refers to a particle size (D50) corresponding to the cumulative frequency of 50%. A pore size distribution diagram of a sample was obtained by the method described later. A sample was pretreated through platinum sputtering (Q150R available from Quorum, 20 mA/30 sec), and then a FE-SEM image of a surface was obtained using an electron beam of 3 kV/10 uA. A median pore size was calculated from the obtained image using an image analysis software (ImageJ, NIH). Black and white colors of pore and resin parts were distinguished based on the brightness of the image using the threshold function of the ImageJ, and then the obtained black and white image was analyzed with an analyze particles function to obtain a pore size distribution.

2. Surface Roughness of Support

An arithmetic mean roughness (Ra) of the support was measured using an atomic force microscope (AFM, Dimension Icon AFM available from Bruker) at room temperature. Specifically, an area of 3 μm×3 μm was measured at a scan rate of 0.8 Hz and a resolution of 1024×1024 in a tapping mode using a silicon cantilever (TESPA-V2) having an end radius of less than 10 nm and a spring coefficient of 37 N/m, thereby determining an Ra value. The Ra values of 10 samples were measured in the same manner to calculate an average value.

3. Gas Permeability (Gurley) of Support

A gas permeability of a support was measured as a Gurley permeability, and specifically, is a value of time it takes for 100 cc of air to pass through an area of 1 in² (square inch), measured in seconds, according to the standard of ASTM D726 using a Gurley densometer available from Toyoseiki.

4. Tensile Strength of Support

A tensile strength of a support was measured in a transverse direction (TD) and a machine direction (MD) in accordance with ASTM-D-882-61T.

5. Performance of Composite Separator

Performance of the composite separator was evaluated by process stability, a specific surface area of a selective layer, and gas separation performance. The separation performance is based on permeability and selectivity.

First, process stability was evaluated by whether the support satisfied mechanical strength conditions to withstand tension applied in a continuous application process of applying a solution for forming a selective layer on the support. Usually, when a solution is applied on a film having a width of 1,000 mm and a thickness of 10 μm by a continuous process, a tension of 100 N or more may be applied, when it is converted based on the area, a tensile strength of at least 10 MPa or more is required. Specifically, when the tensile strength values in the MD and TD directions of the support were both 30 MPa or more, this was indicated as "○". When any one of the tensile strength values in the MD and TD directions was equal to or greater than 10 and less than 30 MPa, this was indicated as "Δ". However, when any one of the tensile strength values in the MD and TD directions was less than 10 MPa, this was indicated as "x".

Next, the specific surface area of the selective layer was calculated by the following Equation 1:

> Specific surface area of selective layer=(surface area of selective layer in m²)/(volume of composite separator in m³). Equation 1

Finally, the gas separation performance of the separators manufactured according to the examples and the comparative examples was evaluated by measuring their permeability and selectivity. The permeability is a value calculated by dividing a flux of each gas passing through the separator by a separator area and pressure difference between one side of the separator and another side of the separator, and the unit is a gas permeation unit (GPU), in which $1 \text{ GPU}=10^{-6} \text{ cm}^3$ (STP)/(cm² s cm Hg). The selectivity is a ratio between a permeability of a specific gas to be obtained through the separator and a permeability of another gas to be extruded. Specifically, the permeability was measured under the conditions of a pressure difference of 1 bar, a temperature of 30° C., and a film area of 14.52 cm² with a single gas (carbon dioxide or nitrogen) having a purity of 99.995% or more, and the flow rate of each gas passing through the separator was measured using a soap film detection type flow meter (VP-3 available from Horiba). The selectivity was calculated from a ratio between a carbon dioxide permeability and a nitrogen permeability.

Example 1

As the support, a porous polyethylene film having the properties shown in Table 1 was manufactured and prepared. 2 wt % of PEBAX® MH 1657 (Arkema) and 98 wt % of an ethanol aqueous solution (70 wt % of ethanol and 30 wt % of distilled water) were mixed, and stirring was performed at 80° C. for 2 hours to prepare a solution for forming a selective layer. 9 wt % of SYLGARD 184-A (main material, Dow Corning) and 1 wt % of 184-B (curing agent) were mixed with 90 wt % of n-hexane and stirring was performed at room temperature for 30 minutes to prepare a solution for forming a middle layer.

The solution for forming a middle layer was coated on the porous polyethylene film in a bar coating manner under a speed condition of 40 mm/sec with a mayer bar (or mayer rod) from RDS, and was dried for 10 minutes in an oven at 60° C. to manufacture a porous polyethylene film on which the middle layer having a thickness of 300 nm was formed. Next, the solution for forming a selective layer was coated on the middle layer in a bar coating manner under a speed condition of 40 mm/sec with a mayer bar from RDS, and was dried for 1 hour in an oven at 60° C. to manufacture a composite separator on which the selective layer having a thickness of 150 nm was formed. The performance of the manufactured composite separator is shown in the following Table 2.

Comparative Examples 1 to 4

A composite separator in which a middle layer having a thickness of 300 nm and a selective layer having a thickness of 150 nm were formed on the support was manufactured in the same manner as in Example 1, except that a porous polyethylene film having other properties shown in Table 1 was manufactured by a wet method and prepared, instead of the porous polyethylene film used in Example 1. The performance of the manufactured separator is shown in the following Table 2.

Comparative Example 5

A composite separator in which a middle layer having a thickness of 300 nm and a selective layer having a thickness of 150 nm were formed on the support was manufactured in the same manner as in Example 1, except that a polypropylene porous film having the properties shown in Table 1 was manufactured by a dry method and prepared, instead of the porous polyethylene film used in Example 1. The performance of the manufactured separator is shown in the following Table 2.

Comparative Example 6

A composite separator in which a middle layer having a thickness of 500 nm and a selective layer having a thickness of 750 nm were formed on the support was manufactured in the same manner as in Example 1, except that a porous polyethylene film having the properties shown in Table 1 was manufactured by a wet method and prepared, instead of the porous polyethylene film used in Example 1. The performance of the manufactured separator is shown in the following Table 2.

Comparative Example 7

A composite separator in which a middle layer having a thickness of 300 nm and a selective layer having a thickness of 150 nm were formed on the support was manufactured in the same manner as in Example 1, except that a polyester non-woven fabric having the properties shown in Table 1 was used, instead of the porous polyethylene film used in Example 1. The performance of the manufactured separator is shown in the following Table 2.

Comparative Example 8

A composite separator in which a middle layer having a thickness of 300 nm and a selective layer having a thickness of 150 nm were formed on the support was manufactured in the same manner as in Example 1, except that a polyethylene non-woven fabric having the properties shown in Table 1 was used, instead of the porous polyethylene film used in Example 1. The performance of the manufactured separator is shown in the following Table 2.

Comparative Example 9

A composite separator in which a middle layer having a thickness of 300 nm and a selective layer having a thickness of 150 nm were formed on the support was manufactured in the same manner as in Example 1, except that a polyethylene porous film having the properties shown in Table 1 was manufactured by a dry method and prepared, instead of the porous polyethylene film used in Example 1. The performance of the manufactured separator is shown in the following Table 2.

TABLE 1

| | | | | | | Physical properties of support | | |
| | | Thickness | | Tensile strength | | Median pore | | |
| | | Middle | Selective | | | diameter | | Gurley |
| Classification | Support | layer | layer | MD | TD | of surface | Roughness | permeability |
| Unit | μm | Nm | nm | MPa | MPa | nm | nm | sec/100 cc |
|---|---|---|---|---|---|---|---|---|
| Example 1 | 10 | 300 | 150 | 180 | 110 | 135 | 23.7 | 117 |
| Comparative Example 1 | 10 | 300 | 150 | 138 | 80 | 45 | 20.5 | 855 |
| Comparative Example 2 | 10 | 300 | 150 | 142 | 85 | 305 | 2.5 | 88 |
| Comparative Example 3 | 10 | 300 | 150 | 145 | 90 | 330 | 2.5 | 120 |
| Comparative Example 4 | 10 | 300 | 150 | 133 | 73 | 105 | 105 | 130 |
| Comparative Example 5 | 25 | 300 | 150 | 6.5 | 1.2 | 148 | 10.7 | 118 |
| Comparative Example 6 | 50 | 500 | 750 | 25 | <5 | 400 | 57 | 50 |
| Comparative Example 7 | 150 | 300 | 150 | 10 | <5 | ≥1000 | ≥1,000 | 8 |
| Comparative Example 8 | 150 | 300 | 150 | 20 | <5 | ≥1000 | ≥1,000 | 6 |
| Comparative Example 9 | 25 | 300 | 150 | 37 | 13 | 315 | 5.8 | 278 |

TABLE 2

| | | Composite separator performance | | |
| | Process stability | Specific surface area of selective | $CO_2$ | $CO_2$ |
| Classification | evaluation | layer | permeability | selectivity |
|---|---|---|---|---|
| Unit | — | m²/m³ | GPU | — |
| Example 1 | o | 18,000 | 270 | 35 |
| Comparative Example 1 | o | 18,000 | 187 | 35.8 |
| Comparative Example 2 | o | 18,000 | 447 | 14.3 |
| Comparative Example 3 | o | 18,000 | 230 | 13.8 |
| Comparative Example 4 | o | 18,000 | 246 | 8.9 |
| Comparative Example 5 | x | 7,200 | 480 | 6.6 |
| Comparative Example 6 | x | 3,600 | 75 | 30.7 |
| Comparative Example 7 | x | 1,200 | 670 | 5.4 |
| Comparative Example 8 | x | 1,200 | 630 | 6.7 |
| Comparative Example 9 | Δ | 7,200 | 493 | 5.8 |

Figure 2:
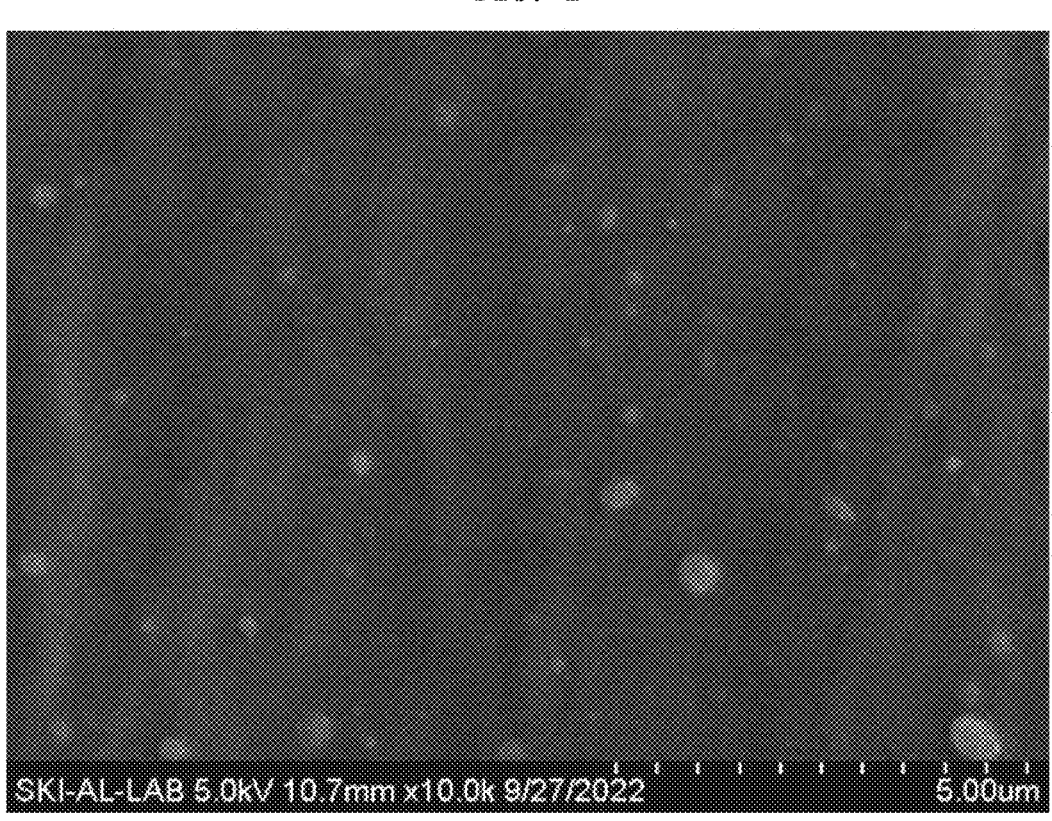
FIG. 2 is an SEM image of a surface of the selective layer of Example 1.

Referring to Tables 1 and 2, the composite separator of Example 1 had the physical properties shown in Table 1, and the permeability and the selectivity were 250 GPU or more and 20 or more, respectively, which were confirmed to be significantly excellent. As seen from FIG. 2 illustrating an SEM image of the selective layer surface of Example 1, this is because no defect such as a pin hole occurred on the surface of the selective layer which was a thin film having a thickness of 150 nm.

However, the composite separators of the comparative examples having a surface median pore diameter of the support of more than 300 nm or a surface roughness of more than 100 nm had significantly low selectivity, and thus, are shown to be unable to perform separation function properly.

Figure 3:
FIG. 3 is an SEM image of a surface of the selective layer of Comparative Example 3.
Figure 4:
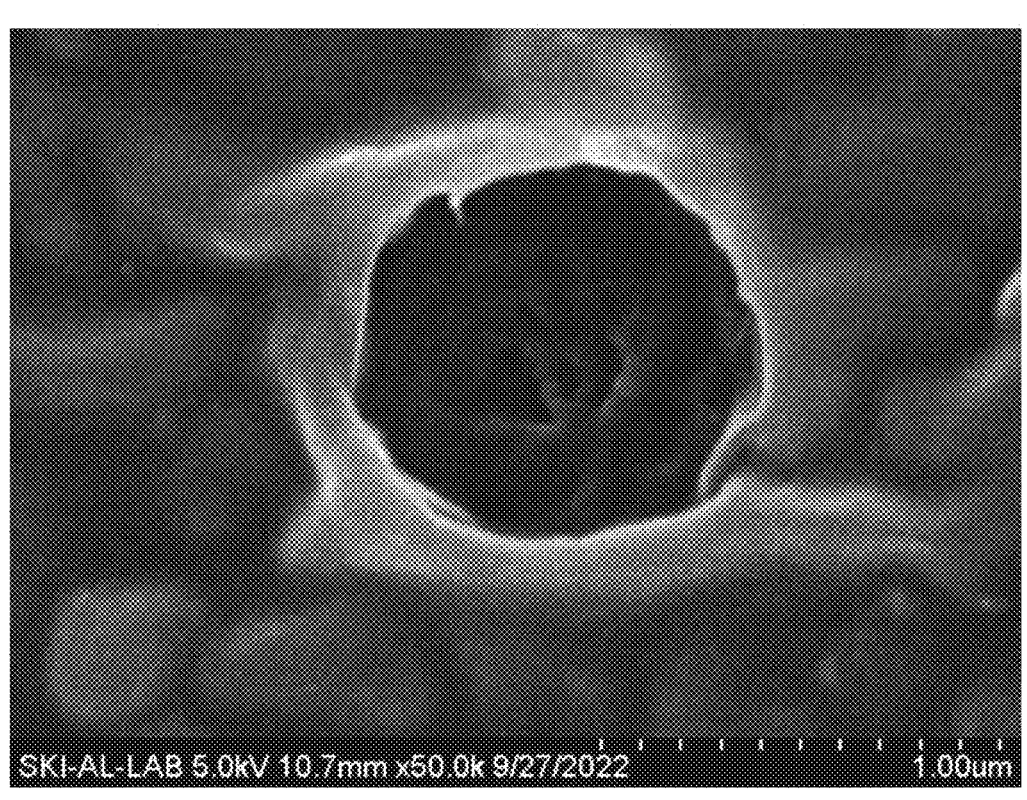
FIG. 4 is an SEM image at 10 times magnification of the image of FIG. 3.

As shown in FIGS. 3 and 4, pin holes occurred, which caused a significant decrease in selectivity. The composite separator of Comparative Example 6 in which the middle layer and the selective layer have thicknesses of 500 nm and 750 nm, respectively, for preventing occurrence of defects caused a significant decrease in permeability due to an increase in the thickness in spite of the maintained selectivity.

Meanwhile, the composite separator of Comparative Example 5 showed a significant decrease in selectivity even though the roughness and the median average pore size of the support were similar to those of the Example 1, and this is because the tensile strength in the MD and TD directions was less than 10 MPa and defects occurred throughout the composite separator due to pressure occurring during gas permeation, unlike the example having the tensile strength of 30 MPa or more.

In addition, since the support used in Example 1 satisfied the tensile strength of 30 MPa or more, it was able to withstand high tension which may be applied to the separator in a selective layer application process and a module assembly process and process stability was excellent. In addition, since it had a significantly high tensile strength while having a significantly small thickness of 10 μm, it may fill a selective layer having a large area per separator volume (18,000 m²/m³) during module assembly, and thus, an effect of a significantly increased separation permeation amount was shown even in a module having the same volume.

Thus, it is shown that the composite separator for gas separation according to an embodiment had excellent mechanical strength and also included a support of a thin film having specific surface properties, whereby a selective layer of a thin film was uniformly formed without occurrence of defects to significantly improve selectivity and permeability, and process stability and selective layer filling density were improved.

The composite separator for gas separation according to the present disclosure uses a support having specific surface properties, thereby uniformly forming a selective layer of a thin film to have both significantly improved selectivity and permeability without occurrence of defects.

In addition, by using a support having high mechanical strength, high tension which may be applied to the separator in a selective layer application process and a module assembly process may be withstood and process stability may be increased.

Besides, when the thickness of the support is small while having excellent mechanical properties, a selective layer having a large area per separator volume may be filled during module assembly, and thus, an effect of having a significantly increased separation permeation amount is shown even in a module having the same volume.

The above description is only an example to which the principle of the present disclosure is applied, and other constitution may be further included without departing from the scope of the present disclosure.

What is claimed is:

1. A composite separator for gas separation, the composite separator comprising:
   a support including a porous polyethylene film;
   a selective layer; and
   a middle layer including a siloxane-based polymer or a polyacetylene-based polymer disposed between the support and the selective layer,
   wherein the support has a surface roughness of 100 nm or less, a surface median pore diameter of 300 nm or less, and a tensile strength in a machine direction (MD) and a transverse direction (TD) of 10 MPa or more.

2. The composite separator for gas separation of claim 1, wherein the porous polyethylene film has a gas permeability of 850 sec/100 cc or less.

3. The composite separator for gas separation of claim 1, wherein the support has a surface roughness of 50 nm or less.

4. The composite separator for gas separation of claim 1, wherein the support has a thickness ranging from 5 $\mu$m to 100 $\mu$m.

5. The composite separator for gas separation of claim 1, wherein the selective layer has a thickness ranging from 10 nm to 500 nm.

6. The composite separator for gas separation of claim 1, further comprising: a protective layer disposed on the selective layer.

7. The composite separator for gas separation of claim 1, wherein the composite separator has a thickness of 150 $\mu$m or less.

8. The composite separator for gas separation of claim 1, wherein a specific surface area of the selective layer according to the following Equation is 10,000 m$^2$/m$^3$ or more:

$$\text{Specific surface area of selective layer} = \text{surface area of selective layer (m}^2\text{)/volume of composite separator (m}^3\text{).} \qquad \text{[Equation 1]}$$

9. A gas separation method comprising separating a specific gas from a gas mixture using the composite separator of claim 1.

10. The gas separation method of claim 9, wherein the specific gas is selected from the group consisting of carbon dioxide, hydrogen, helium, oxygen, hydrocarbon, and olefin.

11. The composite separator for gas separation of claim 6, wherein the protective layer comprises a siloxane-based polymer.

12. The composite separator for gas separation of claim 6, wherein the protective layer has a thickness of 100 to 2000 nm.

13. The composite separator for gas separation of claim 6, wherein the middle layer has a thickness of 100 to 500 nm.

*    *    *    *    *